(12) United States Patent
Sobajima et al.

(10) Patent No.: US 10,106,031 B1
(45) Date of Patent: Oct. 23, 2018

(54) FUEL TANK JOINT

(71) Applicant: TOYODA GOSEI CO., LTD., Kiyosu-shi, Aichi-ken (JP)

(72) Inventors: Tomokazu Sobajima, Troy, MI (US); Kenta Kuwayama, Troy, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/635,907

(22) Filed: Jun. 28, 2017

(51) Int. Cl.
| | |
|---|---|
| *B60K 15/04* | (2006.01) |
| *F16L 37/084* | (2006.01) |
| *F16K 15/06* | (2006.01) |
| *B60K 15/01* | (2006.01) |

(52) U.S. Cl.
CPC .......... *B60K 15/0403* (2013.01); *B60K 15/01* (2013.01); *F16K 15/063* (2013.01); *F16L 37/0841* (2013.01); *B60K 2015/047* (2013.01); *Y10T 137/86372* (2015.04)

(58) Field of Classification Search
CPC ................ B60K 15/0403; B60K 15/01; B60K 2015/047; Y10T 137/86372; F16L 37/0841
See application file for complete search history.

(56) References Cited

U.S. PATENT DOCUMENTS

| | | | |
|---|---|---|---|
| 2009/0320956 A1* | 12/2009 | Ando | B60K 15/04 |
| | | | 141/60 |
| 2012/0012527 A1 | 1/2012 | Allen et al. | |
| 2012/0125927 A1* | 5/2012 | Watson | B60K 15/0403 |
| | | | 220/86.3 |
| 2014/0027451 A1* | 1/2014 | Kaneko | B60K 15/01 |
| | | | 220/86.2 |
| 2017/0008392 A1 | 1/2017 | Sekihara et al. | |

FOREIGN PATENT DOCUMENTS

| | | |
|---|---|---|
| JP | 2006-088951 A | 4/2006 |
| JP | 2010-0006246 A | 1/2010 |
| JP | 2014-019413 A | 2/2014 |
| JP | 2017-013779 A | 1/2017 |

\* cited by examiner

*Primary Examiner* — Atif Chaudry
(74) *Attorney, Agent, or Firm* — Posz Law Group, PLC

(57) ABSTRACT

A fuel tank joint includes a tubular joint body and an entry restriction member. The joint body includes a support portion. The entry restriction member includes a body tube, a groove, a guide, and an engagement hook. The body tube has opposite open ends in the flow direction of fuel. The groove extends upstream from the downstream end of the body tube and is engaged with the support portion. The guide is formed in part of the body tube that includes the downstream end of the body tube and guides the groove to the support portion by contacting the support portion when the body tube is inserted into the joint body. The engagement hook is formed in a downstream end section of the body tube and engaged with the support portion, from a downstream side, in a state in which the groove is engaged with the support portion.

9 Claims, 8 Drawing Sheets

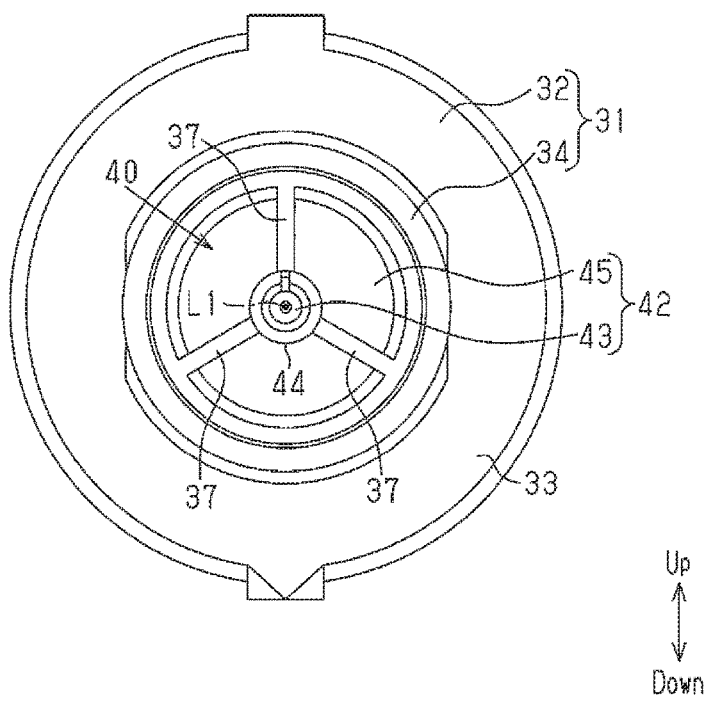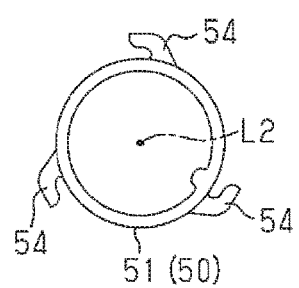

FUEL TANK JOINT

BACKGROUND OF THE INVENTION

The present invention relates to a fuel tank joint that joins a fuel tank and a filler pipe to each other. More specifically, the invention relates to a fuel tank joint including an entry restriction member that restricts fuel extraction.

Fuel extraction from a vehicle may be carried out using a small-diameter fuel extraction hose, which is inserted into the fuel tank from the filler opening through the filler pipe. In this regard, Japanese Laid-Open Patent Publication No. 2006-88951, for example, discloses a fuel tank joint in which an entry restriction member is mounted in a joint body that joins a filler pipe and a fuel tank to each other. As described in this document, the entry restriction member is arranged in the joint body. In the fuel tank joint disclosed in the document, a pipe member independent from the joint body is inserted in the joint body to fix the entry restriction member to the joint body. Further, multiple projections are formed on the joint body to restrict separation of the pipe member from the joint body. The projections are heated to be bent.

The fuel tank joint prevents the distal end of the fuel extraction hose from reaching the fuel in the fuel tank by means of the entry restriction member, thus preventing fuel extraction.

However, the conventional fuel tank joint disclosed in Japanese Laid-Open Patent Publication No. 2006-88951 needs the pipe member, which is independent from the joint body, to mount the entry restriction member in the joint body. Also, in addition to the step for arranging the entry restriction member in the joint body, a step for inserting the pipe member into the joint body and a step for fixing the pipe member to the joint body by heating and bending the projections of the joint body are necessary.

SUMMARY OF THE INVENTION

Accordingly, it is an objective of the present invention to provide a fuel tank joint capable of facilitating mounting of an entry restriction member in a joint body without using a member independent from the joint body.

To achieve the foregoing objective and in accordance with one aspect of the present invention, a fuel tank joint is provided that is configured to join a fuel tank and a filler pipe that introduces fuel into the fuel tank to each other. The fuel tank joint includes a tubular joint body, which includes a support portion that is located inside the joint body and formed integrally with the joint body, and an entry restriction member configured by a member independent from the joint body. The entry restriction member is inserted into the joint body and supported by the support portion, thereby restricting entry of a fuel extraction hose into the fuel tank. The entry restriction member includes a tubular body tube having opposite open ends in a flow direction of the fuel, a groove that extends upstream from a downstream end in the flow direction of the body tube and is engaged with the support portion, a guide formed in part of the body tube that includes the downstream end, and an engagement hook formed in a downstream end section in the flow direction of the body tube. The guide guides the groove to the support portion by contacting the support portion when the body tube is inserted into the joint body. The engagement hook is engaged with the support portion from a downstream side in the flow direction in a state in which the groove is engaged with the support portion.

Other aspects and advantages of the embodiments will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which:

FIG. 8A is a front view showing a joint body to which a check valve is attached as viewed from the upstream side in the flow direction of the fuel;

FIG. 8B is a front view showing the entry restriction member as viewed from the upstream side in the flow direction of the fuel;

DETAILED DESCRIPTION OF THE PREFERRED EMBODIMENTS

First Embodiment

A fuel tank joint 30 according to a first embodiment will now be described with reference to FIGS. 1 to 9C.

Figure 1:
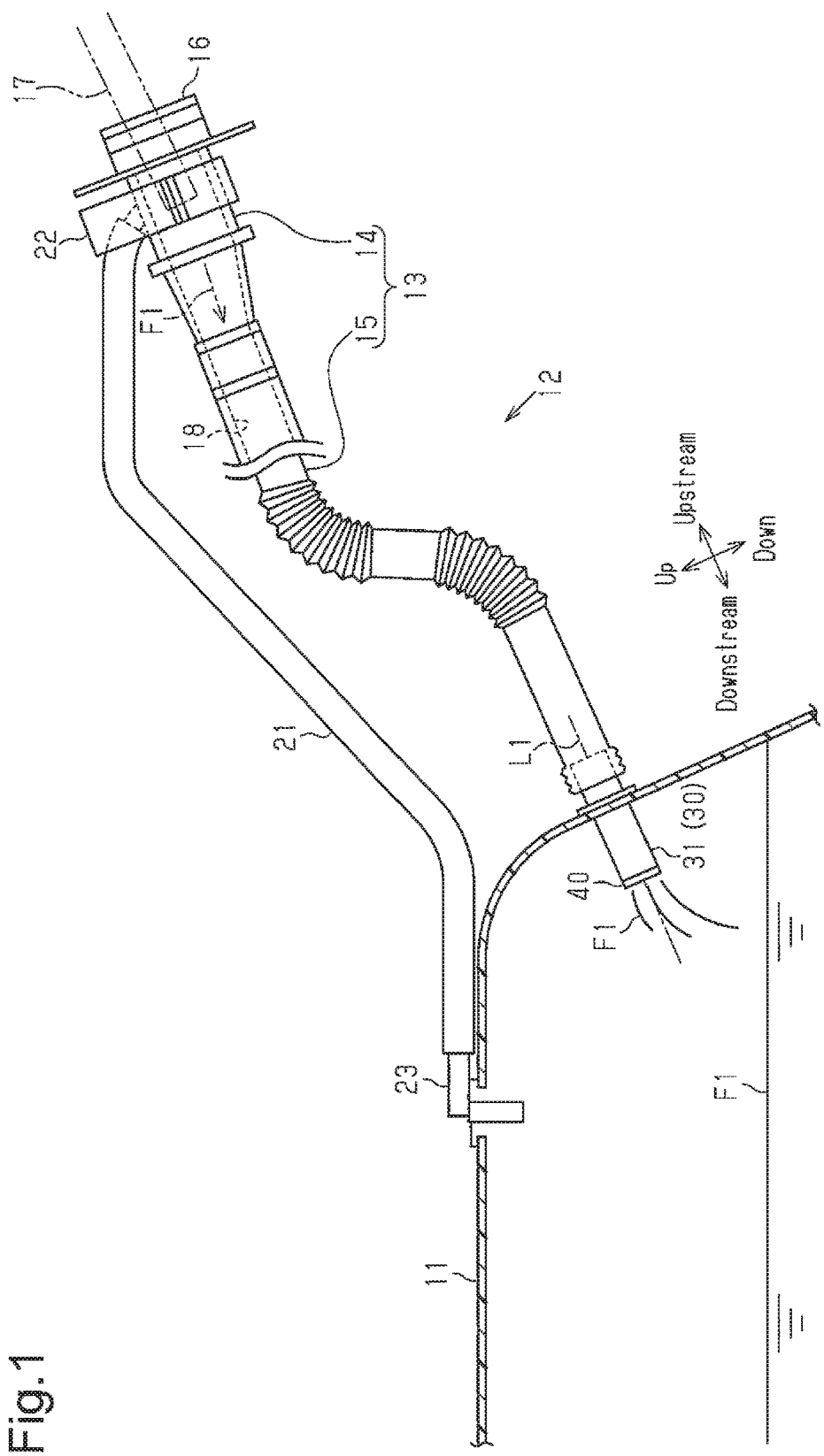
FIG. 1 is an explanatory diagram illustrating the location at which a fuel tank joint according to a first embodiment is employed.

FIG. 1 shows the location at which the fuel tank joint 30 is employed. A non-illustrated opening is formed in an upper section of a side wall of a plastic fuel tank 11 for a vehicle. The fuel tank joint 30 configures part of a fuel supply device 12, which supplies fuel F1 to the fuel tank 11 through the opening.

The fuel supply device 12 includes a filler pipe 13, a fixing member 22, a fuel vapor pipe 21, and a gas release portion 23, in addition to the fuel tank joint 30.

The filler pipe 13 is configured by a plastic filler neck 14 and a plastic filler tube 15, which is connected to the filler neck 14. The fixing member 22 fixes the filler neck 14 to a non-illustrated fuel filler portion of the vehicle.

The filler tube 15 has bellows-like portions at a few positions. The filler tube 15 can be selectively extended, contracted, and bent by means of the bellows-like portions. The filler tube 15 is connected to the fuel tank 11 through the fuel tank joint 30. The filler pipe 13 and the fuel tank joint 30 form a fuel line 18, which extends from a filler opening 16 to the fuel tank 11.

Specifically, the filler tube 15 may be bent in advance to form a fuel pipe along a predetermined path from the fuel tank 11 and be connected to the filler neck 14. In this case, the filler tube 15, which is bent in advance, is held by the vehicle at suitable positions in the path using non-illustrated mounting hardware or the like.

An end section of the fuel vapor pipe 21 is connected to the fuel tank 11 through the gas release portion 23. The opposite end section of the fuel vapor pipe 21 is connected to the filler neck 14. The gas release portion 23 introduces the air in the tank, which contains fuel vapor, to the fuel vapor pipe 21. When fuel is supplied from a fueling gun 17 through the filler opening 16, the fuel vapor is introduced into the fuel tank 11 via the fuel line 18, together with the supplied fuel F1.

Figure 2:
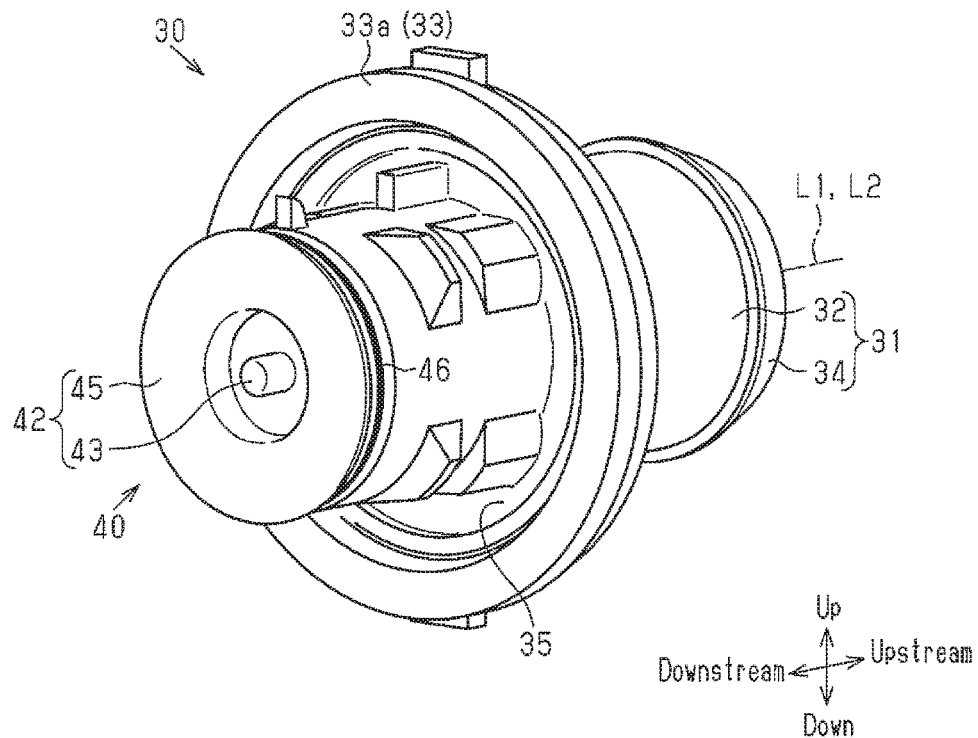
FIG. 2 is a perspective view showing the fuel tank joint as viewed from the downstream side in the flow direction of fuel.
Figure 3:
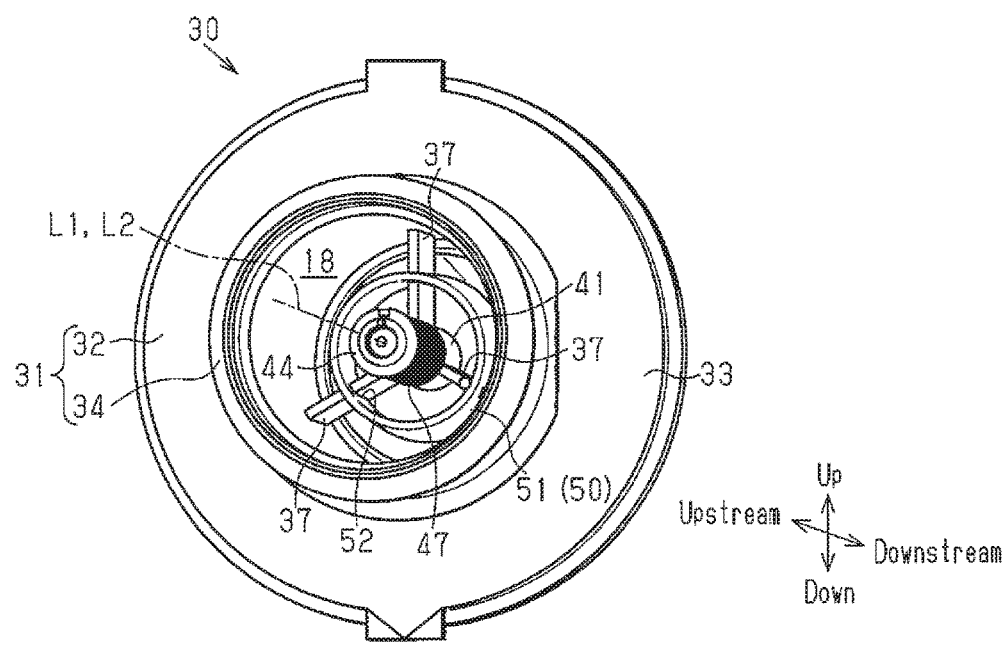
FIG. 3 is a perspective view showing the fuel tank joint as viewed from the upstream side in the flow direction of the fuel.
Figure 5:
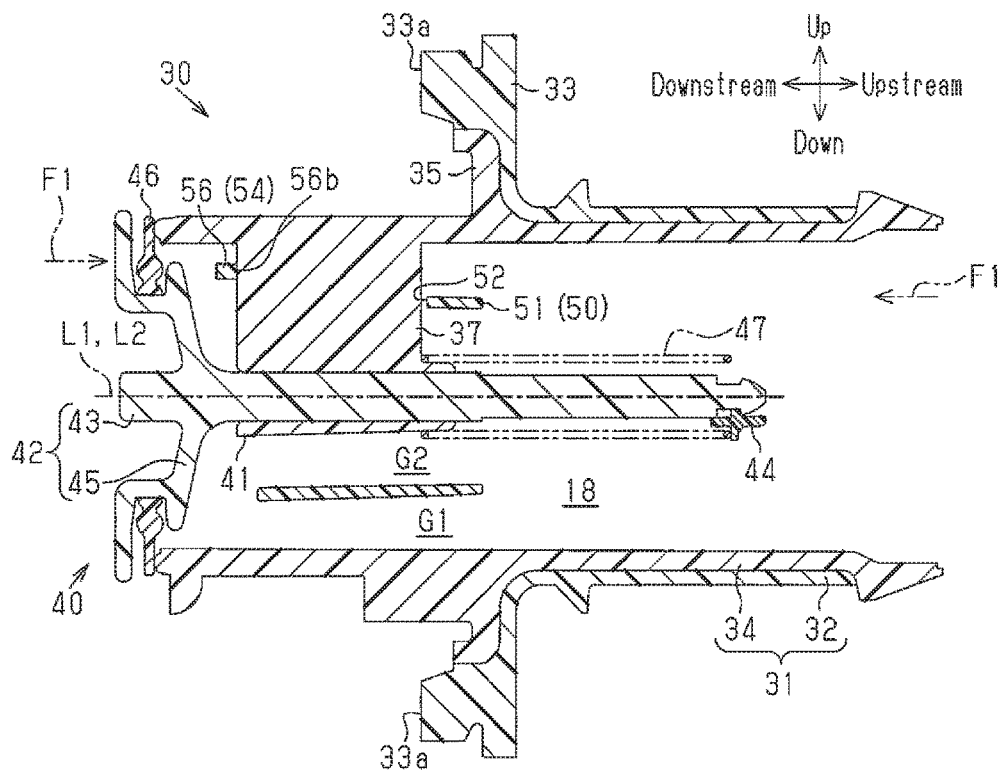
FIG. 5 is a cross-sectional view taken along line 5-5 of FIG. 4A.

The fuel tank joint 30 will hereafter be described. As shown in FIGS. 2, 3, and 5, the fuel tank joint 30 includes a joint body 31, a check valve 40, and an entry restriction member 50.

<Joint Body 31>

Figure 10:
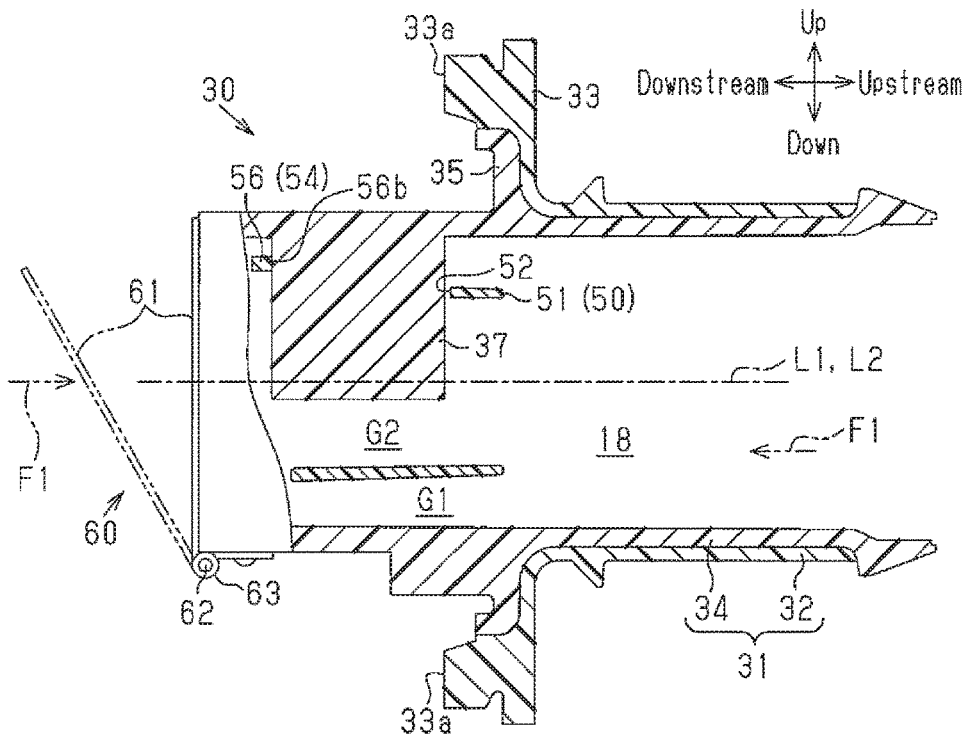
FIG. 10 is a cross-sectional side view showing a fuel tank joint according to a second embodiment.
Figure 11:
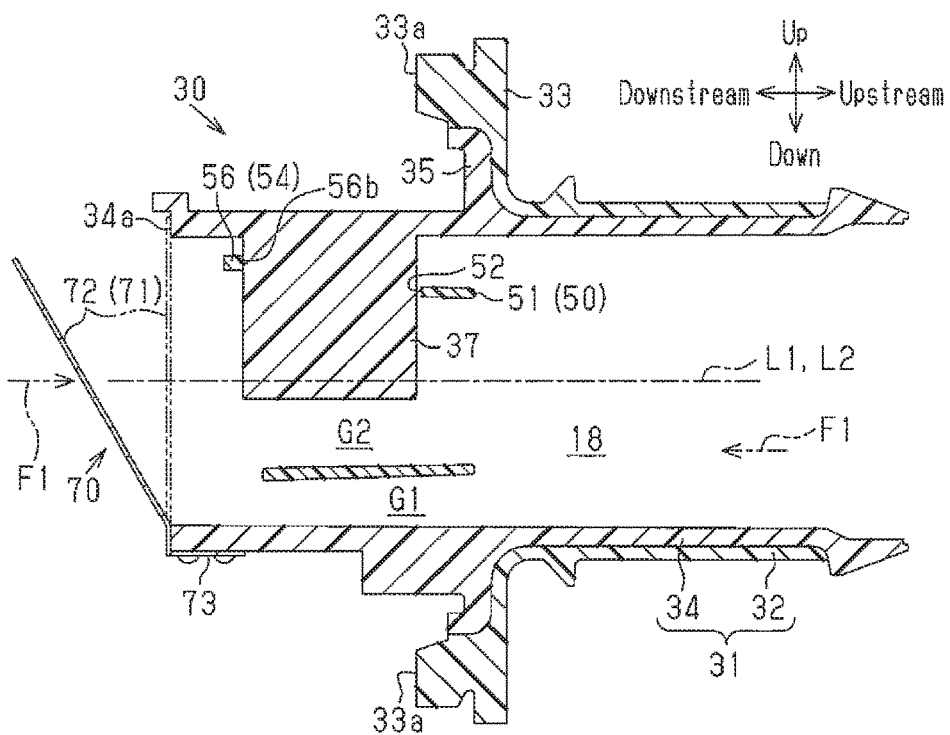
FIG. 11 is a cross-sectional side view showing a fuel tank joint according to a third embodiment.
Figure 12:
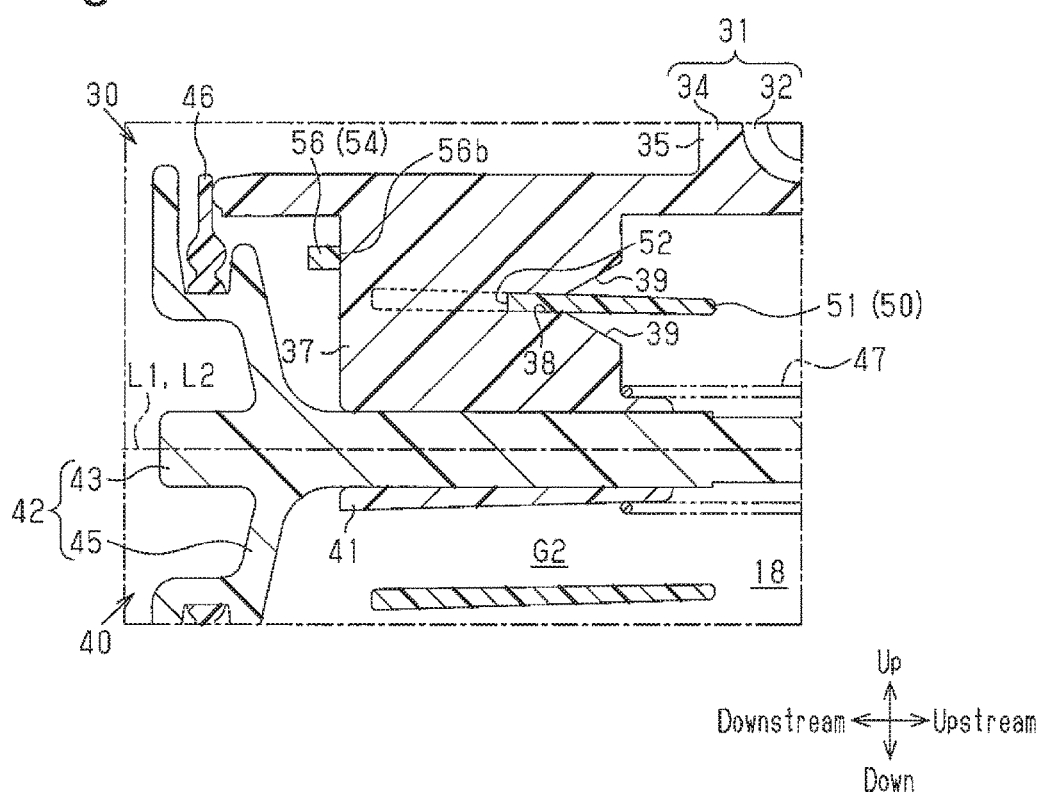
FIG. 12 is a cross-sectional side view showing a section of a fuel tank joint according to a modification in which the number of the support portion is changed to one.

As shown in FIG. 1, the joint body 31 has a tubular shape. The joint body 31 is arranged in a state in which the axis L1 of the joint body 31 is inclined with respect to a horizontal plane such that the end section of the joint body 31 on the side corresponding to the filler opening 16 is located higher than the end section on the side corresponding to the fuel tank 11. As a result, after flowing into the joint body 31 from the end section on the side corresponding to the filler opening 16, the fuel F1 flows toward the end section on the side corresponding to the fuel tank 11 along the axis L1. Regarding the direction along the axis L1, the side closer to the filler opening 16 will be referred to as upstream or the upstream side and the side closer to the fuel tank 11 will be referred to as downstream or the downstream side. The flow direction of the fuel F1 along the axis L1 will be referred to simply as the flow direction. In FIGS. 5 and 9A to 9C, the components of the fuel tank joint 30 are illustrated in a horizontal state. FIG. 10 illustrating a second embodiment, FIG. 11 illustrating a third embodiment, and FIG. 12 illustrating a modification, which will be described later, show components in manners similar to those of FIGS. 5 and 9A to 9C.

As shown in FIGS. 1 and 5, the joint body 31 includes an outer tube 32, which is made of plastic that can be thermally welded to the fuel tank 11, and an inner tube 34, which is made of plastic that has a low swelling property. The joint body 31 is formed by two-color molding. The outer tube 32 is made of, for example, modified polyethylene. The inner tube 34 is made of, for example, polyamide.

Most of the outer tube 32 has a cylindrical shape in which both the upstream end and the downstream end are open. This cylindrical portion of the outer tube 32 is covered by the downstream end section of the filler pipe 13, which is fastened to the outer tube 32 using a non-illustrated clamp, connector, or the like. A flange 33 is formed in a downstream end section of the outer tube 32.

The inner tube 34 has a length greater than that of the outer tube 32. Most of the inner tube 34 has a cylindrical shape in which both the upstream end and the downstream end are open. A flange 35, which has a diameter smaller than that of the flange 33, is formed in a middle section in the flow direction of the inner tube 34. The flange 35 of the inner tube 34 is arranged downstream of the flange 33 of the outer tube 32.

An upstream end section of the inner tube 34 and part of the inner tube 34 located downstream of the flange 35 are both exposed from the outer tube 32. Hereinafter, the part of the inner tube 34 located downstream of the flange 35 will be referred to simply as a downstream section of the inner tube 34. The downstream section of the inner tube 34 projects into the fuel tank 11 through the above-described opening of the fuel tank 11. The region between the upstream end section of the inner tube 34 and the flange 35 is arranged in the outer tube 32.

As shown in FIGS. 3 and 8A, three support portions 37 are formed integrally with the downstream section of the inner tube 34. The three support portions 37 have the same shape. Each of the support portions 37 is shaped as a thin plate that extends along the axis L1 of the joint body 31. Each support portion 37 extends radially outward from the axis L1 to be connected to an inner wall surface of the inner tube 34. The three support portions 37 are spaced apart by equal angles about the axis L1. That is, the support portions 37 are spaced apart by 120° about the axis L1.

The joint body 31 is joined to the fuel tank 11 by being welded to the fuel tank 11 by means of a welding portion 33a (see FIGS. 2 and 5), which is set in the flange 33 of the outer tube 32. The welding portion 33a is set at a position in the flange 33 that surrounds the opening of the fuel tank 11.

<Check Valve 40>

As shown in FIGS. 2, 5, and 8A, the check valve 40 includes a valve guide 41, a valve body 42, and an elastic member. The check valve 40 is attached to the joint body 31.

The valve guide 41 has a circular tubular shape and is arranged in a state in which the axis of the valve guide 41 coincides with the axis L1 of the joint body 31. The valve guide 41 is connected to the above-described three support portions 37.

The valve body 42 has a shaft 43 and an umbrella portion 45. The shaft 43 has a columnar shape and is longer than the valve guide 41. The shaft 43 is inserted in the valve guide 41 to be slidable in the above-described flow direction. As shown in FIG. 3, a spring receiver 44 is engaged with an upstream end section of the shaft 43. The spring receiver 44 is arranged upstream of the valve guide 41 and the entry restriction member 50.

The umbrella portion 45 is arranged in a downstream end section of the shaft 43 and located downstream of the valve guide 41. Part of the umbrella portion 45 is configured by an annular seal seat plate 46. The seal seat plate 46 is made of elastic material such as rubber. The umbrella portion 45 is selectively brought close to and separated from the downstream end of the inner tube 34 as the shaft 43 slides.

As shown in FIGS. 3 and 5, the elastic member is configured by a coil spring 47, which is wound around the shaft 43 at a position upstream of the support portions 37. The coil spring 47 is arranged between the spring receiver 44 and the three support portions 37 in a compressed state. The coil spring 47 urges the valve body 42 toward the upstream side, which is the leading side in the direction in which the umbrella portion 45 is brought closer to the downstream end of the joint body 31.

<Entry Restriction Member 50>

Figure 4A:
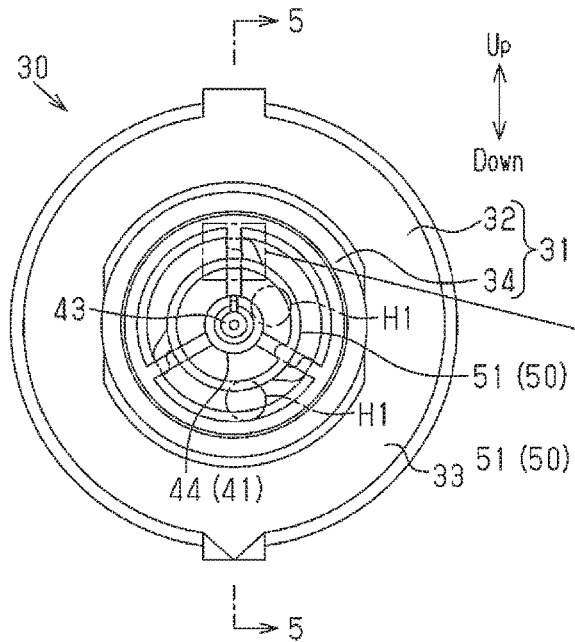
FIG. 4A is a front view showing the fuel tank joint as viewed from the upstream side in the flow direction of the fuel.
Figure 4B:
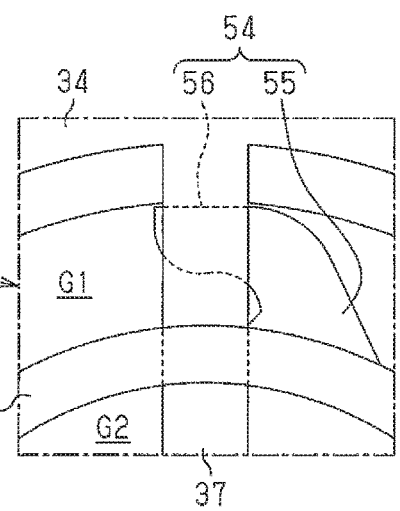
FIG. 4B is an enlarged front view showing a section of FIG. 4A.

As shown in FIGS. 8A and 8B, the entry restriction member 50 is configured by a member independent from the joint body 31. As shown in FIGS. 4A and 4B, a main portion of the entry restriction member 50 is configured by a cylindrical body tube 51 in which both an upstream end and a downstream end are open. A tube having an outer diameter smaller than the inner diameter of the inner tube 34 is used as the body tube 51.

The outer diameter of the body tube 51 is set to satisfy the conditions listed below.

Condition 1: The body tube 51 must have such an outer diameter that, in a state in which the entry restriction member 50 is supported by all of the support portions 37, a gap G1 narrower than the outer diameter of a fuel extraction hose H1 is formed between the outer wall surface of the body tube 51 and the inner wall surface of the inner tube 34.

Condition 2: The body tube 51 must have such an outer diameter that, in a state in which the body tube 51 is supported by all of the support portions 37, a gap G2 narrower than the outer diameter of the fuel extraction hose H1 is formed between the inner wall surface of the body tube 51 and the outer wall surface of the valve guide 41.

Figure 6:
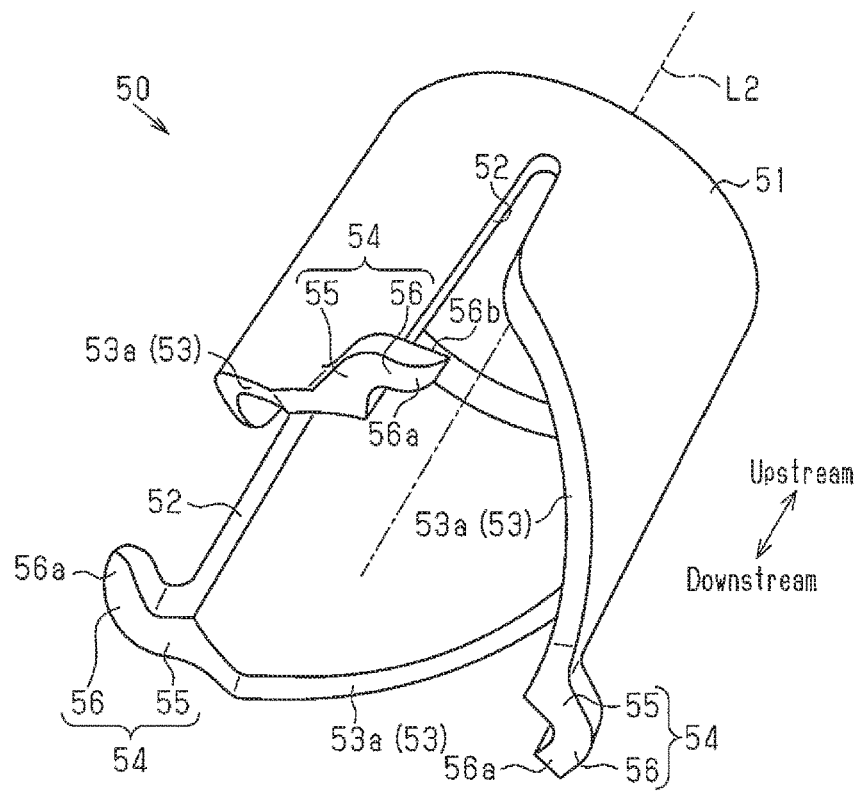
FIG. 6 is a perspective view showing an entry restriction member as viewed from the downstream side in the flow direction of the fuel.
Figure 7:
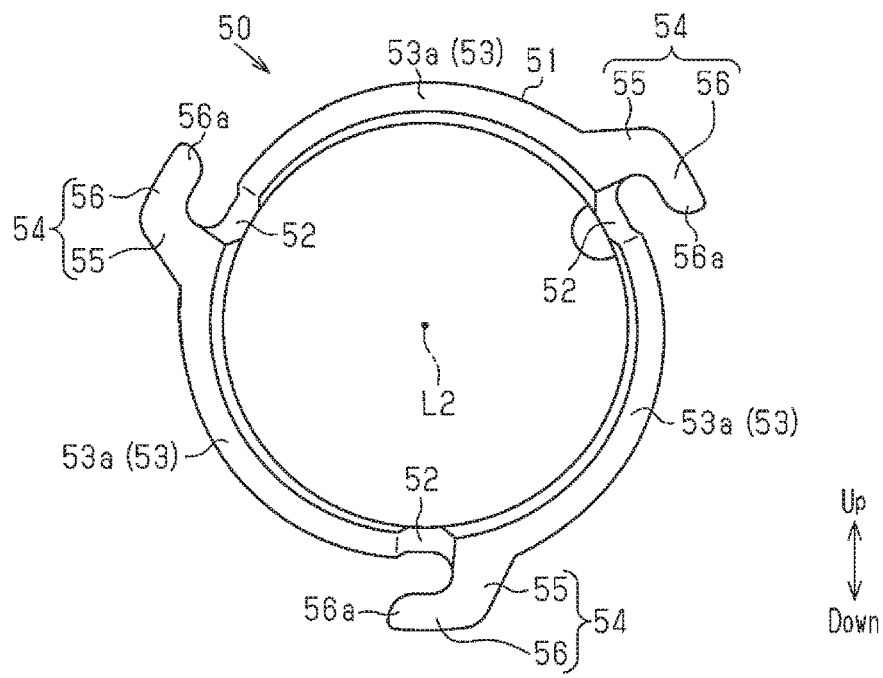
FIG. 7 is a back view showing an entry restriction member as viewed from the downstream side in the flow direction of the fuel.

As shown in FIGS. 6 and 7, the entry restriction member 50 includes three sets of grooves 52, guides 53, and engagement hooks 54, the number of which is equal to the number of the support portions 37. The sets are spaced apart by equal angles about the axis L2 of the body tube 51. That is, the sets are spaced apart by 120° about the axis L2 of the body tube 51.

Each of the grooves 52 extends upstream from the downstream end of the body tube 51 along the axis L2. As shown in FIGS. 5 and 9C, the dimension in the flow direction of each groove 52 is set slightly greater than the dimension in the flow direction of each support portion 37. The body tube 51 is engaged with a middle section of each support portion 37 in the radial direction of the joint body 31 in the corresponding groove 52.

In the above-described manner, each groove 52 becomes engaged with the corresponding support portion 37 in an intersecting state. The entry restriction member 50 is thus supported by the three support portions 37 with respect to the inner tube 34.

As shown in FIGS. 6 and 7, each of the guides 53 is formed by cutting out part (a downstream section) of the body tube 51 that includes the downstream end of the body tube 51. Each guide 53 has an inclined surface 53a, which satisfies the following condition. The condition is that the distance between each of the inclined surfaces 53a and the corresponding one of the grooves 52 in the circumferential direction of the body tube 51 decreases in an upstream direction.

Each of the engagement hooks 54 is configured by a projecting portion 55 and a hook 56. Each of the projecting portions 55 projects radially outward from a position adjacent to the corresponding one of the grooves 52 in the circumferential direction of the body tube 51 on an outer circumferential surface of a downstream end section of the body tube 51. Each of the hooks 56 extends from the distal end of the projecting portion 55 toward the corresponding groove 52 in the circumferential direction of the body tube 51. Each hook 56 is located outward with respect to the corresponding groove 52 in the circumferential direction of the body tube 51. The dimension (the radius) of the body tube 51 from the axis L2 to an outer surface of each hook 56 is set to such a dimension that, in a state in which the entry restriction member 50 is supported by all of the support portions 37, the outer surface of the hook 56 contacts or is close to the inner wall surface of the inner tube 34. More specifically, the dimension (the radius) of the body tube 51 from the axis L2 to the outer surface of each hook 56 is set slightly smaller than the dimension (the radius) from the axis L1 to the inner wall surface of the inner tube 34.

A curved surface 56a is formed on a downstream end surface of each hook 56. The curved surface 56a is gradually curved such that it is located closer to the upstream side as the circumferential distance from the projecting portion 55 increases. Instead of the curved surface 56a, the downstream end surface of each hook 56 may have an inclined surface that is inclined such that it is located closer to the upstream side as the circumferential distance from the projecting portion 55 increases.

An upstream end surface 56b of each hook 56 is located downstream of the support portions 37 in a state in which the corresponding grooves 52 are engaged with the support portions 37. Each of the upstream end surfaces 56b contacts or is close to the downstream end of the corresponding one of the support portions 37.

Operation and advantages of the fuel tank joint 30, which is configured as described above, will hereafter be described.

<When Mounting Entry Restriction Member 50 in Joint Body 31>

To mount the entry restriction member 50 in the joint body 31, the entry restriction member 50 is inserted into the joint body 31 from the upstream side, with the downstream end of the entry restriction member 50 located on the leading side.

As has been described, the dimension (the radius) from the axis L2 to the outer surface of each hook 56 is slightly smaller than the dimension (the radius) from the axis L1 to the inner wall surface of the inner tube 34. As a result, when the entry restriction member 50 is inserted into the joint body 31, the outer surfaces of the three hooks 56 are brought into contact with the inner surface of the inner tube 34 such that the axis L2 of the body tube 51 is brought closer to the axis L1 of the joint body 31. In this manner, each hook 56 exerts a function of assisting in positioning of the body tube 51 in the radial direction.

The aforementioned insertion brings the body tube 51 close to all of the support portions 37. Each set of the engagement hooks 54, the guides 53, and the grooves 52 is also brought close to the corresponding support portion 37.

Figure 9A:
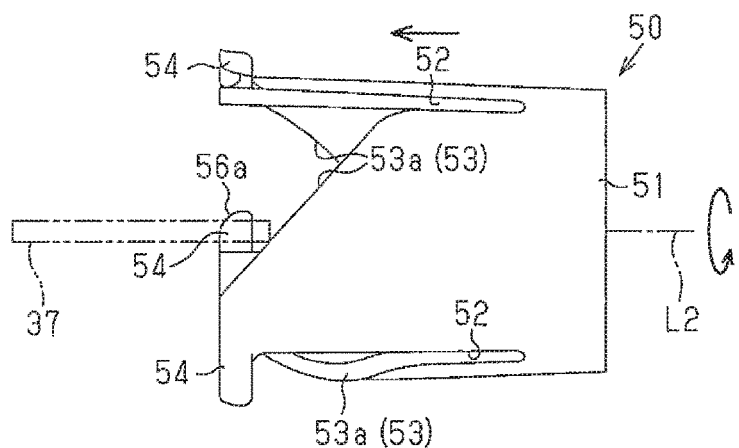
FIGS. 9A to 9C are side views illustrating a manner in which a groove of the entry restriction member is guided to a support portion by a guide.

If, at the time of the insertion, the inclined surface 53a of each guide 53 is located upstream of the corresponding support portion 37, the inclined surface 53a is brought into contact with the upstream end of the support portion 37, as shown in FIG. 9A, as the inclined surface 53a is brought closer to the support portion 37.

Although not illustrated, if, at the time of the insertion, each hook 56 is located upstream of the corresponding support portion 37, the hook 56 is brought into contact with the upstream end of the support portion 37 as the hook 56 is brought closer to the support portion 37. The curved surface 56a of each hook 56 is gradually curved such that it is located closer to the upstream side as the circumferential distance from the projecting portion 55 increases. As a result, when each engagement hook 54 is brought into contact with the corresponding support portion 37 by means of the curved surface 56a as the entry restriction member 50 is inserted into the joint body 31, the entry restriction member 50 is rotated in such a direction in which each guide 53 is brought closer to the support portion 37 as the entry restriction member 50 is inserted. Through such rotation, each inclined surface 53a becomes located upstream of the corresponding support portion 37. Also in this case, the inclined surface 53a is brought into contact with the upstream end of the support portion 37.

Figure 9B:
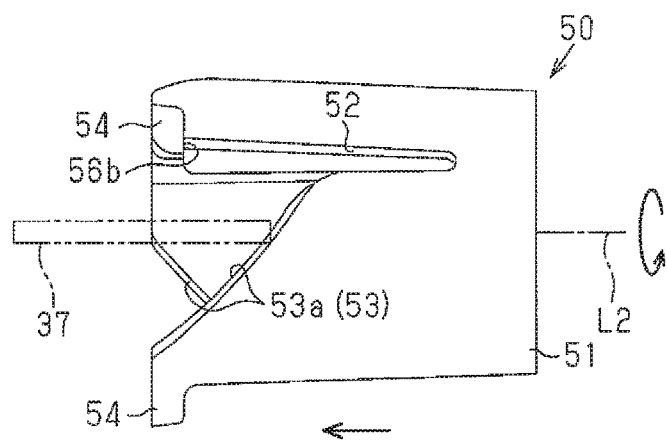
Figure 9C:
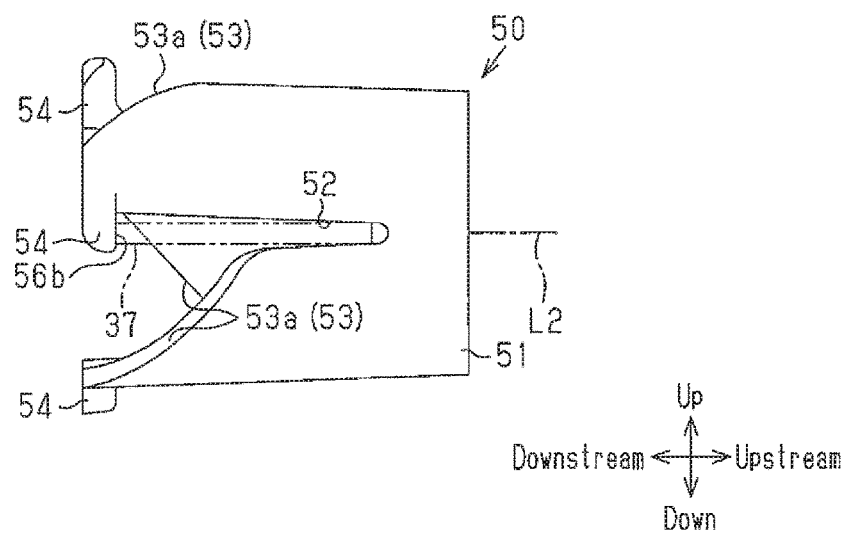

As has been described, the distance between each inclined surface 53a and the corresponding groove 52 in the circumferential direction of the body tube 51 decreases toward the upstream side. As a result, if the body tube 51 is further inserted into the joint body 31 in a state in which each inclined surface 53a contacts the upstream end of the corresponding support portion 37, the body tube 51 is rotated as the body tube 51 is inserted, as shown in FIG. 9B. This changes the positions at which the inclined surfaces 53a contact the support portions 37, thus bringing the grooves 52 closer to the support portions 37. In this manner, each guide 53 guides the corresponding groove 52 to the support portion 37.

When the entry restriction member 50 is rotated and moved until the grooves 52 are located upstream of the corresponding support portions 37, each groove 52 becomes engaged with the corresponding support portion 37 from the opposite sides in the circumferential direction of the body tube 51, as shown in FIG. 9C. The inner wall surfaces of the groove 52 on the opposite sides in the circumferential direction of the body tube 51 thus sandwich the support portion 37.

Through engagement of each groove 52 with the corresponding support portion 37 in the circumferential direction of the body tube 51, the axis L2 of the body tube 51 coincides with or is brought close to the axis L1 of the joint body 31.

When each groove 52 is entirely engaged with the corresponding support portion 37, the associated engagement hook 54 is engaged with the support portion 37 from the downstream side. As shown in FIGS. 4B and 5, an upstream end surface 56b of each hook 56 is located downstream of the corresponding support portion 37 and contacts or is close to the downstream end of the support portion 37. The upstream end surface 56b of the hook 56 thus functions as a stopper to restrict upstream movement and separation of the entry restriction member 50 from the support portion 37.

As shown in FIGS. 4A and 4B, through engagement of the grooves 52 and the engagement hooks 54 with all of the support portions 37, which are formed at multiple positions about the axis L1 in the joint body 31, the entry restriction member 50 is mounted in a stable state with respect to the joint body 31.

As has been described, simple operation of inserting the entry restriction member 50 into the joint body 31 from the upstream side engages the entry restriction member 50 with the support portions 37 by means of the grooves 52 and engagement hooks 54, thus mounting the entry restriction member 50 in the joint body 31. Further, since the support portions 37 are formed integrally with the interior of the joint body 31, it is unnecessary to prepare an independent member corresponding to the support portions 37 and fix the member to the joint body 31 to mount the entry restriction member 50 in the joint body 31.

<Non-Fuel Filling Time>

Without supply of the fuel F1 to the fuel tank 11 through the filler pipe 13, the flow pressure of the fuel F1 acting toward the downstream side is not applied to the umbrella portion 45 of the valve body 42 in the check valve 40, as shown in FIGS. 1 and 5. As a result, the seal seat plate 46 of the valve body 42, which is urged upstream by the coil spring 47, is pressed against the downstream end of the inner tube 34 and the fuel line 18 in the joint body 31 is closed.

Such closure restricts backflow of the fuel F1 from the fuel tank 11 to the filler pipe 13 through the interior of the joint body 31.

<Fuel Filling Time>

As shown in FIG. 1, when the fueling gun 17 is inserted in the filler opening 16 to supply the fuel F1, the fuel F1 flows sequentially through the filler pipe 13 and the fuel tank joint 30. In the fuel tank joint 30, the fuel F1 flows from the upstream end to the downstream end of the joint body 31. As shown in FIGS. 4A and 4B, the fuel F1 passes through the gap G1 between the body tube 51 and the inner tube 34 and the gap G2 between the valve guide 41 and the body tube 51. The fuel F1 that has passed through the gaps G1, G2 applies force to the umbrella portion 45, which is shown in FIG. 5, to depress the umbrella portion 45. When such force exceeds the urging force of the coil spring 47, the shaft 43 is caused to slide with respect to the valve guide 41, thus moving the valve body 42 downstream. Such movement separates the seal seat plate 46 from the downstream end of the inner tube 34. The fuel F1 that has flowed into the joint body 31 thus passes through the space between the seal seat plate 46 and the downstream end of the inner tube 34 and is supplied into the fuel tank 11.

Specifically, when the fuel F1 passes through the gaps G1, G2, the support portions 37 and the entry restriction member 50 operate to hamper passing of the fuel F1. In the first embodiment, thin plate-like components are used as the support portions 37 and the body tube 51. This decreases passage resistance of the support portions 37 and the body tube 51 received by the fuel F1 at the time of fuel filling, compared with a case in which thick plate-shaped components or components having a shape different from a plate are used as the support portions 37 and the body tube 51.

The multiple support portions 37 extend radially from the axis L1 of the joint body 31. This reduces each support portion 37 in size and increases the communication area of the passage. Increase of the passage resistance of the support portions 37 is thus restrained.

The support portions 37 and the body tube 51, which have the thin plate-like shapes, extend along the axis L1 of the joint body 31. The support portions 37 and the body tube 51 will thus exert a function of regulating the flow of the fuel F1.

As has been described, at the time of fuel filling, the entry restriction member 50 receives the force acting downstream from the fuel F1. However, the grooves 52, which are engaged with the support portions 37, extend from the downstream end to the upstream end of the body tube 51. The upstream end of each groove 52 is located at a position spaced downstream from the upstream end of the body tube 51. As a result, even when the entry restriction member 50 receives the aforementioned force from the fuel F1 and is urged to move downstream, the upstream end of each groove 52 contacts the corresponding support portion 37, thus restricting further downstream movement of the entry restriction member 50. This restricts downstream separation of the entry restriction member 50 from the support portions 37.

<When Action to Extract Fuel F1 is Performed>

As shown in FIGS. 4A and 4B, the width of the gap G1, which is between the body tube 51 and the inner tube 34, and the width of the gap G2, which is between the body tube 51 and the valve guide 41, are both smaller than the outer diameter of the fuel extraction hose H1.

As a result, even when the fuel extraction hose H1 with a small diameter is inserted into the filler pipe 13 from the filler opening 16, a distal end section of the fuel extraction hose H1 is brought into contact with at least one of the entry restriction member 50, the inner tube 34, the spring receiver 44, and the coil spring 47. Insertion of the fuel extraction hose H1 is thus hampered by the component that contacts the fuel extraction hose H1. This prohibits the distal end section of the fuel extraction hose H1 from reaching the surface of the fuel F1 in the fuel tank 11. The fuel extraction hose H1 thus cannot draw the fuel F1 from the fuel tank 11, which prevents extraction of the fuel F1.

The present embodiment has the advantages described below, in addition to the advantages described above.

The support portions 37 are originally designed to support the valve guide 41 of the check valve 40 with respect to the inner tube 34. The entry restriction member 50 is supported by the inner tube 34 by being engaged with all of the support portions 37 by means of the grooves 52. In this manner, the support portions 37, which support the valve guide 41, are used as support portions that support the entry restriction member 50 with respect to the inner tube 34. It is thus unnecessary to arrange a specific independent support portion that supports the entry restriction member 50 with respect to the inner tube 34.

In other words, the fuel tank joint 30 of the first embodiment may be employed regardless of whether or not extraction of the fuel F1 is restricted. That is, if restriction of extraction of the fuel F1 is unnecessary, the entry restriction member 50 may be or may not be mounted in the joint body 31. In either case, the filler pipe 13 is joined to the fuel tank 11 by means of the fuel tank joint 30. Also, backflow of the fuel F1 from the fuel tank 11 to the filler pipe 13 is restricted by the check valve 40.

The engagement hooks 54 are located upstream of the check valve 40. The check valve 40 restricts backflow of the fuel F1 in the joint body 31 from the fuel tank 11 toward the filler pipe 13. The force of the fuel F1 acting upstream is unlikely to be applied to the entry restriction member 50. As a result, disengagement of the engagement hooks 54 from the support portions 37 and separation of the entry restriction member 50 from the support portions 37 to the upstream side are unlikely to happen.

As alternative means for restricting extraction of the fuel F1, a large diameter portion may be arranged in a downstream section of the filler pipe 13 and an entry restriction member having a shape that is elastically deformable in the radial direction may be engaged with and mounted in the large diameter portion. In this case, the entry restriction member is inserted into the filler pipe 13 from the filler opening 16 in an elastically deformed state with a reduced diameter. Such reduction in the diameter causes the entry restriction member to accumulate elastic energy by which the entry restriction member is urged to expand radially outward. When pressing force is applied to the entry restriction member, the entry restriction member is moved downstream in the filler pipe 13 in the state with a reduced diameter. When the entry restriction member reaches the large diameter portion, the entry restriction member is released from the force by which the entry restriction member has been reduced in diameter. The entry restriction member is then increased in diameter by its elastic restoration force to restore the shape before the diameter reduction. The entry restriction member thus presses the inner wall surface of the large diameter portion and becomes engaged with the large diameter portion. This restricts movement of the entry restriction member downstream of the large diameter portion. In this manner, the entry restriction member is held by the large diameter portion of the filler pipe 13.

Also in this case, entry of the fuel extraction hose H1 into the fuel tank 11 is restricted by the entry restriction member. However, to mount the entry restriction member in the filler pipe 13, the entry restriction member must be moved by a long distance. Further, sliding resistance is produced between the entry restriction member, which is reduced in diameter, and the inner wall surface of the filler pipe 13. The entry restriction member thus must be pressed by force exceeding the sliding resistance, which lowers mounting efficiency of the entry restriction member disadvantageously.

However, in the first embodiment, the entry restriction member 50 is mounted in the joint body 31 by being inserted from the upstream end of the joint body 31 to the support portions 37. The distance from the upstream end of the joint body 31 to the support portions 37 is smaller than the distance from the filler opening 16 to the large diameter portion of the filler pipe 13. Further, in the first embodiment, the entry restriction member 50 is not reduced in diameter to be caused to slide with respect to the inner wall surface of the joint body 31. This facilitates mounting the entry restriction member 50 in the joint body 31, which improves the mounting efficiency.

Second Embodiment

A second embodiment of the fuel tank joint 30 will hereafter be described with reference to FIG. 10.

The second embodiment uses a check valve 60, which is of a type different from that of the first embodiment. The main portion of the check valve 60 is configured by a flap valve 61 formed by a plate. The flap valve 61 has such a size that the flap valve 61 is capable of blocking a non-illustrated downstream opening of the inner tube 34. The flap valve 61 is supported by a hinge shaft 62 in a manner pivotal with respect to the downstream end section of the inner tube 34. A torsion coil spring 63 is installed on the hinge shaft 62. The flap valve 61 is constantly urged by the elastic force of the torsion coil spring 63 in a closing direction of the aforementioned opening of the inner tube 34.

Other than the differences described above, the second embodiment is the same as the first embodiment. Thus, like or the same reference numerals are given to those components that are like or the same as the corresponding components described above in the first embodiment and detailed explanations are omitted.

In the second embodiment, at the non-fuel filling time, the flap valve 61 is urged by the torsion coil spring 63 to close the aforementioned opening of the inner tube 34 as represented by the solid lines in FIG. 10. The flap valve 61 thus restricts backflow of the fuel F1 from the fuel tank 11 to the filler pipe 13 through the joint body 31. In contrast, at the fuel filling time, the flap valve 61 receives the flow pressure of the fuel F1 against the elastic force of the torsion coil spring 63. As represented by the long dashed double-short dashed lines in FIG. 10, the flap valve 61 is pivoted about the hinge shaft 62 to open the opening of the inner tube 34.

As a result, the second embodiment achieves the same advantages as the first embodiment.

However, in the second embodiment, the check valve 60 is formed without a component corresponding to the valve guide 41 of the first embodiment. A support portion that supports the valve guide 41 with respect to the inner tube 34 is thus unnecessary. Therefore, in the second embodiment, the support portions 37, which support the entry restriction member 50 with respect to the inner tube 34, must be arranged separately. A third embodiment, which will be described later, also needs such arrangement of the support portions 37.

Third Embodiment

A third embodiment of the fuel tank joint 30 will now be described with reference to FIG. 11.

The third embodiment uses a check valve 70, which is of a type different from those of the first and second embodiments. The main portion of the check valve 70 is configured by a valve plate 71, which is formed by a leaf spring. The valve plate 71 is formed by punching thin spring material plate. The valve plate 71 includes a stopper portion 72 and an attachment portion 73. The stopper portion 72 is sized and shaped such that the stopper portion 72 is capable of closing a downstream opening 34a of the inner tube 34. The attachment portion 73 is connected to a peripheral edge section of the stopper portion 72 and is angled with respect to the stopper portion 72. The valve plate 71 is attached to the downstream end section of the inner tube 34 by means of the attachment portion 73.

Other than the differences described above, the third embodiment is the same as the first and third embodiments. Thus, like or the same reference numerals are given to those components that are like or the same as the corresponding components described above in the first and second embodiments and detailed explanations are omitted.

In the third embodiment, at the non-fuel filling time, the valve plate 71 is urged by its elastic force to close the opening 34a, as represented by the long dashed double-short dashed lines in FIG. 11. The valve plate 71 thus restricts backflow of the fuel F1 from the fuel tank 11 to the filler pipe 13 through the joint body 31. In contrast, at the fuel filling time, as represented by the solid lines in FIG. 11, the stopper portion 72 is pressed by the flow pressure of the fuel F1 and elastically deformed downstream about the boundary portion between the stopper portion 72 and the attachment portion 73, thus opening the opening 34a.

As a result, the third embodiment achieves the same advantages as the first and second embodiments.

It should be apparent to those skilled in the art that the present invention may be embodied in many other specific forms without departing from the scope of the invention. Particularly, it should be understood that the present invention may be embodied in the following forms.

The number of the support portions 37 may be changed to one, two, or a number greater than three. The number of the sets of the grooves 52, the guides 53, and the engagement hooks 54 may be changed correspondingly. The number of the sets of the grooves 52, the guides 53, and the engagement hooks 54 is preferably equal to the number of the support portions 37 but may be greater than the number of the support portions 37.

FIG. 12 shows a modification of the first embodiment in which a single support portion 37 is formed. The number of the sets of the grooves 52, the guides 53, and the engagement hooks 54 is changed from three to one. In this case, the support portion 37 may be a support portion that has a plate-like shape and extends outward from the valve guide 41 in the radial direction of the joint body 31 to be connected to the inner wall surface of the inner tube 34.

Also, as shown in FIG. 12, in addition to the groove 52, which extends upstream from the downstream end of the body tube 51, a groove 38, which extends downstream from the upstream end of the support portion 37, may be arranged in the support portion 37. In this case, the groove 52 of the body tube 51 is engaged with part of the support portion 37 downstream of the groove 38. The groove 38 of the support portion 37 is engaged with part of the body tube 51 upstream of the groove 52.

As shown in FIG. 12, two inclined surfaces 39, which diagonally intersect the axes L1, L2 and are connected to the groove 38, may be formed in an upstream end section of the support portion 37. The upper one of the two inclined surfaces 39 as viewed in FIG. 12 is inclined toward the axes L1, L2 in the downstream direction and is connected to the groove 38. The lower one of the two inclined surfaces 39 as viewed in FIG. 12 is inclined away from the axes L1, L2 in the downstream direction and is connected to the groove 38. The distance between the inclined surfaces 39 is thus maximum at the upstream end of the support portion 37 and decreases toward the downward side. In this configuration, by sliding the body tube 51 with respect to the inclined surfaces 39, the body tube 51 is guided to the grooves 38, which improves the mounting efficiency.

The fuel tank joint 30 may be formed without the check valve 40, 60, or 70. Even in this case, by mounting the entry restriction member 50 in the joint body 31, extraction of the fuel F1 is restricted.

A spring of a type different from the coil spring 47 may be used as the elastic material of the first embodiment. Alternatively, an elastic member other than a spring may be used as long as the elastic member urges the valve body 42 in a direction in which the umbrella portion 45 is brought closer to the downstream end of the inner tube 34.

The curved surface 56a of each engagement hook 54 may be formed throughout the entire downstream end surface of the projecting portion 55 and the entire downstream end surface of the hook 56. In this configuration, the inclined surface 53a and the curved surface 56a of each guide 53 are connected to each other without forming a flat surface.

As a result, regardless of the position at which the engagement hooks 54 contact the corresponding support portions 37 as the entry restriction member 50 is inserted into the joint body 31, the entry restriction member 50 is rotated in a direction in which the guides 53 are brought closer to the support portions 37 as the entry restriction member 50 is inserted. The inclined surfaces 53a are thus located upstream of the corresponding support portions 37 and brought into contact with the upstream ends of the support portions 37.

The present examples and embodiments are to be considered as illustrative and not restrictive, and the invention is not to be limited to the details given herein, but may be modified within the scope and equivalence of the appended claims.

The invention claimed is:

1. A fuel tank joint configured to join a fuel tank and a filler pipe that introduces fuel into the fuel tank to each other, comprising:
   a tubular joint body, which includes a support portion that is located inside the joint body and formed integrally with the joint body; and
   an entry restriction member configured by a member independent from the joint body, wherein the entry restriction member is inserted into the joint body and supported by the support portion, thereby restricting entry of a fuel extraction hose into the fuel tank, wherein
   the entry restriction member includes
      a tubular body tube having opposite open ends in a flow direction of the fuel, a groove that extends upstream from a downstream end in the flow direction of the body tube and is engaged with the support portion, a guide formed in part of the body tube that includes the downstream end, wherein the guide guides the groove to the support portion by contacting the support portion when the body tube is inserted into the joint body, and an engagement hook formed in a downstream end section in the flow direction of the body tube, wherein the engagement hook is engaged with the support portion from a downstream side in the flow direction in a state in which the groove is engaged with the support portion.

2. The fuel tank joint according to claim 1, further comprising a check valve that is attached to the joint body and restricts a backflow of the fuel.

3. The fuel tank joint according to claim 2, wherein the support portion has a shape of a plate that extends along an axis of the joint body, and the groove extends along the axis of the joint body.

4. The fuel tank joint according to claim 3, wherein the body tube has a cylindrical shape, the guide includes an inclined surface that connects the downstream end of the body tube and a middle section in the flow direction of the groove to each other, and the inclined surface is inclined such that a distance between the inclined surface and the groove in a circumferential direction of the body tube decreases toward an upstream side in the flow direction.

5. The fuel tank joint according to claim 4, wherein the joint body includes a cylindrical portion having an inner diameter greater than an outer diameter of the body tube, the support portion extends outward in a radial direction from the axis of the joint body to be connected to the cylindrical portion, and the groove is engaged with a middle section of the support portion in the radial direction.

6. The fuel tank joint according to claim 5, wherein the support portion is one of a plurality of support portions that is formed about the axis in the joint body, a set of the groove, the guide, and the engagement hook is one of a plurality of sets each including a groove, a guide, and an engagement hook, and the number of the sets is at least equal to the number of the support portions.

7. The fuel tank joint according to claim 5, wherein the engagement hook has a projecting portion and a hook, the projecting portion projects outward in the radial direction from a position adjacent to the groove in the circumferential direction of the body tube on an outer circumferential surface of the downstream end section of the body tube, and the hook extends from a distal end of the projecting portion in the circumferential direction of the body tube and is located outward with respect to the groove in a radial direction of the body tube.

8. The fuel tank joint according to claim 7, wherein the support portion is one of a plurality of support portions that is formed about the axis in the joint body, a set of the groove, the guide, and the engagement hook is one of a plurality of sets each including a groove, a guide, and an engagement hook, and the number of the sets is at least equal to the number of the support portions.

9. The fuel tank joint according to claim 2, wherein the check valve includes a circular tubular valve guide that is arranged on an axis of the joint body and is connected to the support portion, and a valve body that includes
   a shaft slidably inserted in the valve guide, and
   an umbrella portion arranged on the shaft at a position downstream in the flow direction of the valve guide, wherein, as the shaft slides, the umbrella portion is selectively brought closer to and separated from a downstream end in the flow direction of the joint body, and an elastic member that urges the valve body in a direction in which the umbrella portion is brought closer to the downstream end of the joint body.

\* \* \* \* \*